United States Patent
Moore et al.

(10) Patent No.: US 6,633,896 B1
(45) Date of Patent: Oct. 14, 2003

(54) METHOD AND SYSTEM FOR MULTIPLYING LARGE NUMBERS

(75) Inventors: Stephen F. Moore, Chandler, AZ (US); Seth Abraham, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,174

(22) Filed: Mar. 30, 2000

(51) Int. Cl.[7] ................................................. G06F 7/52
(52) U.S. Cl. ....................................... 708/620; 708/623
(58) Field of Search ................................ 708/205, 497, 708/503, 501, 523, 524, 620, 654

(56) References Cited

U.S. PATENT DOCUMENTS

| | | | | |
|---|---|---|---|---|
| 4,849,923 A | * | 7/1989 | Samudrala et al. | 708/497 |
| 4,979,141 A | * | 12/1990 | Gelinas et al. | 708/503 |
| 5,126,963 A | * | 6/1992 | Fukasawa | 708/205 |
| 5,144,575 A | * | 9/1992 | Jeong et al. | 708/503 |
| 5,276,634 A | * | 1/1994 | Suzuki et al. | 708/205 |
| 5,909,385 A | * | 6/1999 | Nishiyama et al. | 708/497 |
| 5,963,461 A | * | 10/1999 | Gorshtein et al. | 708/205 |

OTHER PUBLICATIONS

Cetin et al., Analyzing and Comparing Montgomery Multiplication Algorithms, Jun. 1996, IEEE Micro, p. 26–33.*
Peter et al., An Area/Performance Comparision of Subtractive and Multiplicative Divide/Square Root Implementations, 1995, IEEE, p. 132–139.*
Sousa, F.M., et al., "The Computation of Extended–Precision Modular Arithmetic on a DSP Architechture", *PRoceedings of the Internationof Conference on Signal Processing Applications & Technology*, 1603–1607, (1996).

* cited by examiner

*Primary Examiner*—Chuong Dinh Ngo
*Assistant Examiner*—Chat C. Do
(74) *Attorney, Agent, or Firm*—Schwegman, Lundberg, Woessner & Kluth, P.A.

(57) ABSTRACT

The present invention provides a computer-implemented method for multiplying two large multiplicands. The method includes generating a plurality of partial products by multiplying each digit of the first multiplicand with each digit of the second multiplicand. The resulting partial products have a least significant digit and a most significant digit. The method further includes adding each of the most significant digits to a first array and adding each of the least significant digits to a second array. The method then includes adding the first array to the second array, wherein the result is the product of the two original multiplicands.

12 Claims, 3 Drawing Sheets

METHOD AND SYSTEM FOR MULTIPLYING LARGE NUMBERS

FIELD

The present invention relates to the field of computer systems, and more specifically to a method and system for multiplying large numbers on a computer system.

BACKGROUND

Many computer applications require the multiplication of large numbers. For example, some situations when such a need arises are when computers are used for processing or simulating scientific data, or executing a cryptographic system.

Cryptography systems may be used for scrambling private messages, for applying a crack-proof signature on an e-mail message, or for providing for secure online transactions. At their core, modern cryptography systems require two very large numbers, typically 1024 bit or larger, to be multiplied together. However, most modern computer microprocessors only have the native capability to multiply 32 or 64 bit numbers. Thus, software techniques are needed to multiply numbers greater than the processor's native capabilities.

Such software techniques govern the amount of time required by the microprocessor to multiply these large numbers. Thus, inadequate software techniques can negatively affect the system's performance. Moreover, as the use of e-commerce and other secure online transactions increase, there is a need for faster software multiplication techniques so that users can complete transactions quickly.

For the reasons stated above, and for other reasons stated below which will become apparent to those skilled in the art upon reading and understanding the present specification, there is a need in the art for a faster method for the multiplication of large numbers on a computer system.

SUMMARY

In one embodiment, a computer-implemented method for multiplying two large multiplicands includes generating a plurality of partial products by multiplying each digit of the first multiplicand with each digit of the second multiplicand and adding each of the most significant digits of each partial product to an appropriate location in a first array and adding each of the least significant digits of each partial product to an appropriate location in a second array. The method includes adding the first array to the second array, wherein the result is the product of the two original multiplicands. This and various other embodiments are described and claimed below.

DESCRIPTION OF THE EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and changes may be made without departing from the scope of the present invention.

Some portions of the detailed descriptions which follow are presented in terms of algorithms and symbolic representations of operations on data bits within a computer or processor memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
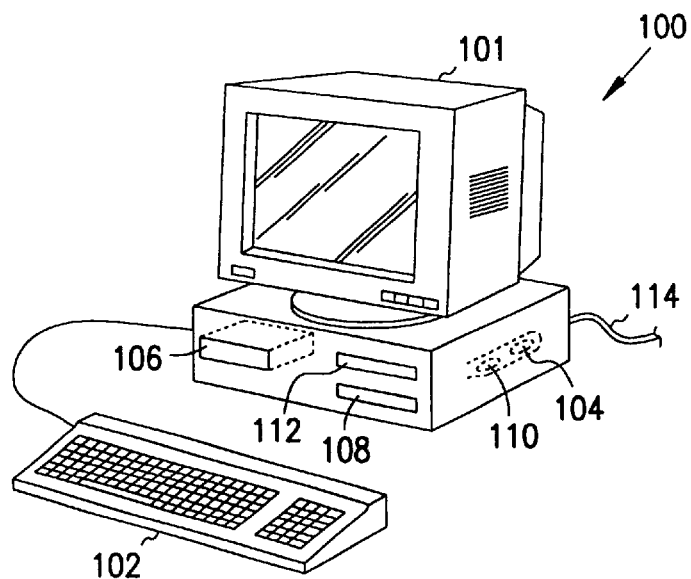
FIG. 1 shows one embodiment of a computer system on which the present system can be performed.

Referring to FIG. 1, a diagram of a computer system 100 in accordance with an embodiment of the present system is shown. The system is not so particularly limited, however, as those of ordinary skill in the art can appreciate. Computers as shown in FIG. 1 typically include a monitor 101, keyboard input 102, and a central processing unit 104, and a memory 110. Further components of a typical computer system may include a machine readable storage media such as hard disk drive 106, floppy disk drive 112, CD-ROM 108, DVD, modem connected to network by input/output line 114, or a flash memory device and the like. The processor unit 104 of such a computer typically includes a microprocessor, memory (RAM and ROM), and other peripheral circuitry, not shown. The various machine readable storage media provide information to memory 110 and processor 104.

Processor 104 is capable of decoding and executing a computer program such as an application program or operating system with instructions from multiple instruction sets. In one embodiment, processor 104 can have an architecture capable of executing single instruction multiple data (SIMD) instructions. SIMD is a class of processor architecture designed for software applications having significant amounts of data having a regular structure that repeat certain operations over and over and process these operations in parallel. SIMD instructions can operate on an array, a vector, or a matrix of data. These instructions take advantage of the regular structure in the algorithms to process multiple operations simultaneously. As is known in the art, performance gains can be substantially improved due to the ability to run the same operations on multiple pieces of data at one time. However, it is necessary when taking advantage of SIMD processors that the data be distributed carefully so that the processor can run the same operations on multiple pieces of data at one time.

Processors, such as exemplary processor 104, have a physical limit, or native capability, on the size of numbers that they can multiply using their integral logic circuits. For example, most modern processors have a native capability to multiply numbers of 32 or 64 bits. Such a processor is limited to multiplying two 32 bit (or 64 bit) numbers at a time. For the purpose of the following description of the present method, the size of the processor's native capability will generally be denoted as n-bit. Thus, for example, in a processor having 32-bit native processor multiply instruction, n is equal to 32, and in a processor having a 1-bit native processor, n is equal to 1.

The present system is used when the numbers to be multiplied together are larger than the native capabilities of the processor that is processing them. Larger numbers can arise when doing scientific applications or when creating and using a cryptography system. For example, many modern cryptography systems use 1024 bit numbers or larger. However, it is to be understood that the present system is not limited by the size of the processor's native capability or the size of the exemplary multiplicands. They are only used for explanation purposes.

Since the numbers to be multiplied together are larger than the machine's native capability, a software method must be utilized to control the partial product multiplication of the large numbers. In the past, algorithms having a multiplication/addition iterative loop have been used. These methods do not permit optimal performance by modern computer processors since each multiplication/addition operation depends on the result of the previous multiplication/addition operation. This is because of a carryout propagation required by the addition step that results in a long chain of multiplication/addition operations, each of which depends on the previous one. These dependencies can have a significant negative impact on the performance of modern processors.

Moreover, on a SIMD machine, these past techniques for performing large number multiplication require several data arrangement operations so that the data can be aligned properly for the carry propagation. Thus, these past techniques do not take advantage of the inherent regular structure of the problem to process multiple operations simultaneously, since they do not permit running the same operations on multiple pieces of data at one time. As will be described below, the present system provides a method for delaying the carry propagation addition until after the multiplications are complete, thus permitting the processor to optimize the multiplication step and the addition step separately.

For the purposes of the following description, the term multiplicand refers to each of the large numbers originally being multiplied together. Also, when a number is described as a digit, it is to be understood to be an n-bit sized number or smaller. Thus, a digit, as used in the following description, can be thought of as at most an n-bit piece of the multiplicand, where n is the size of the largest multiplicand that can be used with the native processor multiply function, which in the exemplary explanation will be 1.

Figure 2:
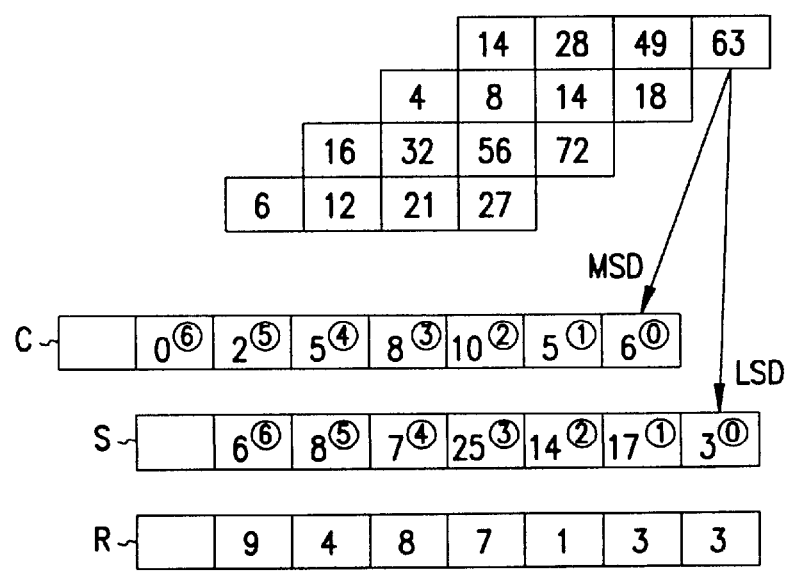
FIG. 2 is an illustration of a pair of exemplary multiplicands and the multiplication thereof.

FIG. 2 will be used to explain some embodiments of the present system. Those skilled in the art will recognize that for computer arithmetic, numbers are usually expressed in binary notation. However, for ease of description, the digits of A and B will be described as base 10 (decimal) numbers being multiplied on a 1-bit processor. It is assumed for the sake of description that the processor which is to multiply A and B can only multiply single digits at a time (i.e. it has an n-bit or native capability of one digit) and that the multiplication of two single digits produces a two digit result. The present system is not so limited, of course, and the present system is applicable to any number system.

FIG. 2 shows an exemplary first multiplicand A, 2479, and an exemplary second multiplicand B, 3827. First multiplicand A includes digits (or n-bit size pieces) 2, 4, 7, and, 9, and second multiplicand B includes digits (or n-bit size pieces) 3, 8, 2, and, 7. Each digit of each number is at most the size of the native capability (1 digit) of the processor.

Figure 3:
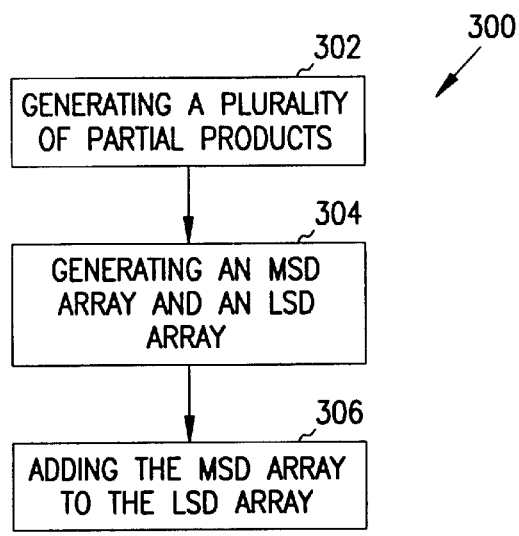
FIG. 3 is a flow chart of one embodiment of a method for multiplying large numbers.

FIG. 3 shows a flow chart illustrating a method 300, one embodiment of a method for the multiplication of large numbers. Method 300 includes, in block 302, generating a plurality of partial products from the digits of the numbers, or multiplicands, generating a most significant digit (MSD) array and a least significant digit (LSD) array in block 304, and adding the MSD array to the LSD array in block 306.

Figure 4:
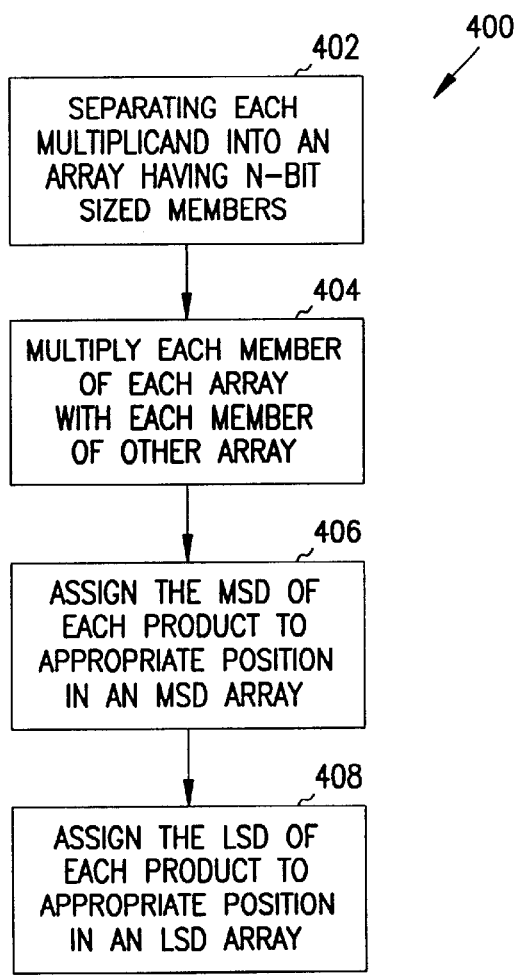
FIG. 4 is a flow chart of one embodiment of details of a method for multiplying large numbers.

FIG. 4 illustrates a flow chart showing one embodiment of a method 400 to perform the instructions of blocks 302 and 304. Method 400 includes, in block 402, separating each multiplicand into a plurality of n-bit (or smaller) size pieces, wherein n is the size of the largest multiplicand that can be used with a native processor multiply instruction.

In block 404, the method includes multiplying each n-bit size piece of the first multiplicand with each n-bit piece of the second multiplicand. The product which results from this multiplication is a number having a most significant digit (MSD) and a least significant digit (LSD).

In block 406, method 400 includes assigning each of the most significant digits to a location in a first array. The location assigned is the location that is equivalent to a sum of the original locations of the digits of each multiplicand that were multiplied together. Each digit assigned to a given location is added together. Referring to FIG. 2, $C[i+j]=\Sigma MSD(A[i] \times B[j])$.

In block 408, the method includes assigning each of the least significant digits to a location in a second array that is equivalent to a sum of the original locations of the digits of each multiplicand that were multiplied together. Each digit assigned to a given location in the second array is also added together. Referring to FIG. 2, $S[i+j]=\Sigma LSD(A[i] \times B[j])$.

The details of the methods 300 and 400 can probably best be understood by referring to the exemplary numbers from FIG. 2. Thus, in applying the methods described above to the exemplary multiplicands in FIG. 2, the number A, 2479, is separated into n-bit sized pieces of 2, 4, 7, and 9, and B is separated into 3, 8, 2, and 7. Each n-bit size piece (or digit) of A and B is then incorporated into an A array and a B array respectively. For the sake of the following discussion, each array will be considered to have a series of locations running from 0 to n. In the illustration shown in FIG. 2, for example, $A[0]=9$; $A[1]=7$; $A[2]=4$; $A[3]=2$.

Each digit, or n-bit piece, of A is then multiplied by each digit of B. Thus, 9 ×7=63; 7×7=49; 7×4=28, and so on. The product formed from the multiplication of each of the digits of the first multiplicand A and the second multiplicand B has a least significant digit and a most significant digit. Thus, partial product 63, which is the product of $A[0]=9$ and $B[0]=7$, has an MSD=6 and an LSD=3. These numbers are assigned into a first array C, for MSD's, and a second array S, for LSD's. The location of each number within its given array is derived from the locations of the original digits of multiplicands A and B. This location index is the sum of the multiplicands original indexes, assuming numbering from zero (i.e. $C[i+j]=\Sigma MSD(A[i]\times B[j])$). For instance, $C[0]=$ MSD $(A[0]\times B[0])=MSD(63)=6$, and $S[0]=LSD(A[0]\times B[0])=LSD(63)=3$. In the case of a single digit product, for example 4×2=8, the least significant digit is 8 and the most significant digit is 0.

The most significant digit array, C, is shown in FIG. 2 to be staggered relative to least significant digit array S. This is merely for ease of illustration since, as will be described below, C[0] will be added with S[1]. However, notwithstanding their positions as shown in the FIG. 2, the rightmost location of MSD array C is C[0], and the rightmost position of LSD array S is S[0]. As all the other partial products of multiplicands A and B are calculated, each product's most significant and least significant digits are added to the appropriate location in the appropriate array. By way of a more detailed example:

```
C[2] = MSD (A[0] × B[2]) + MSD (A[1] × B[1]) +
       MSD (A[2] × B[0]);
C[2] = MSD (9 × 8) + MSD (7 × 2) + MSD (4 × 7);
C[2] = MSD (72) + MSD (14) + MSD (28);
C[2] = 7 + 1 + 2;
C[2] = 10;
S[2] = LSD (72) + LSD (14) + LSD (28);
S[2] = 2 + 4 + 8 = 14.
```

Those skilled in the art will recognize that the methods of blocks 302 and 304 and of blocks 402–408 can be performed concurrently with each other, the order presented is not to be considered as a limiting factor. Advantageously, these partial product multiplications can be performed in any order by a computer processor, such as processor 104. This removal of computational dependencies can be used to exploit the capabilities of some processors to perform out-of-order pipelined execution of operations. This provides that the processor can provide an optimal technique of multiplication because it will not be necessary to wait for an addition carryout propagation to be carried out before or during the multiplication step.

In block 306, method 300 includes adding the first array to the second array while propagating the carryout. This is done only after the steps discussed above pertaining to blocks 302 and 304 are finished. In other words, this step, which requires carry propagation, is delayed until all the multiplications are completed. One embodiment of a method 500 for performing the method of block 306 is illustrated in the flow chart of FIG. 5. In block 502, method 500 includes adding together three values. A first value in a location (x) in the second (LSD) array and a second value of the previous location (x−1) in the first (MSD) array and a carryout value. In block 504, the method includes assigning the least significant digit of the digit(s) in the sum to a third array at the given location (x). In block 506, a new carryout value, which is the most significant digit of the just calculated number, is calculated. The method then returns to block 502 until all the numbers have been added.

Figure 5:
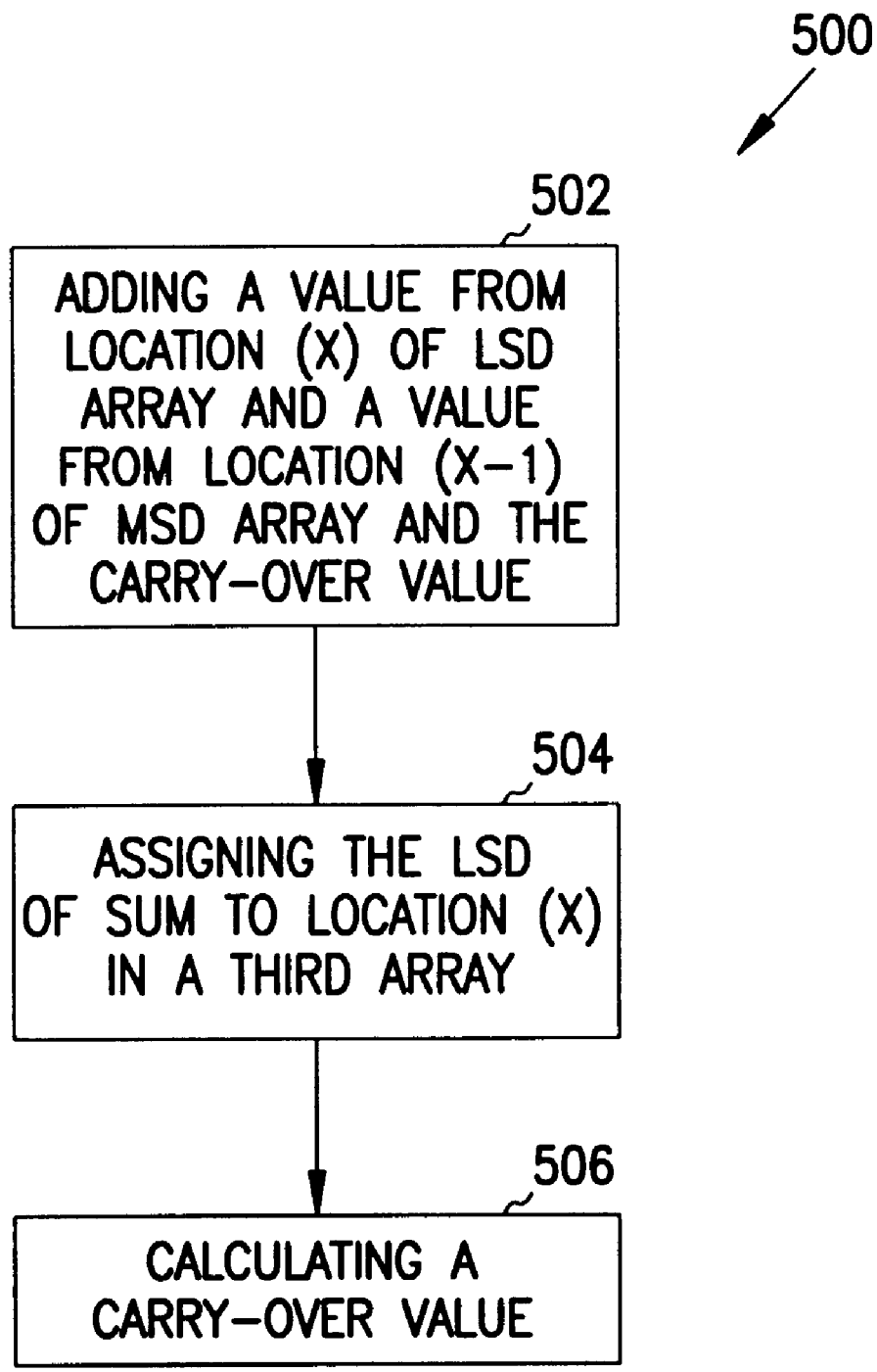
FIG. 5 is a flow chart of one embodiment of details of a method for multiplying large numbers.

The method of FIG. 5 can also be demonstrated by referring to FIG. 2. For example, referring to FIG. 2, R[0]=LSD (S[0])=LSD (3)=3; and R[1]=LSD (S[1]+C[0]+carryout)=LSD (17+6+0)=LSD (23)=3. The MSD of 23, which is 2, will then be the carryout for the next calculation, as follows. R[2]=LSD(S[2]+C[1]+carryout)=LSD(14+5+2)=LSD(21)=1.

```
// Max(n) is the length in n-bits of number A.
// Max(m) is the length in n-bits of number B.
// LSD(X) is the least significant digit of X.
// MSD(X) is the most significant digit of X.
// GENERATING A PAIR OF ARRAYS
Set C[i] and S[i] and R[i] to 0
For each m in 0 to Max(m)
    For each n in 0 to Max(n)
        S[m+n] = S[m+n] + LSD(A[m] × B[n])
        C[m+n] = C[m+n] + MSD(A[m] × B[n])
// ADDING THE ARRAYS TOGETHER
R[0] = LSD (S[0])
C[0] = C[0] + MSD(S[0])
For k=1 to (Max(n) + Max(m)−1)
    S[k] = S[k] + C[k−1]
    R[k] = LSD(S[k])
    C[k] = C[k] + MSD(S[k])
// the final carry
R[Max(m) + Max(n)] = C[Max(m) + Max(n)−1].
```

The present system provides a faster method for the multiplication of large numbers on traditional machines, such as shown in FIG. 1. The system provides for partial products to be generated and assigned to a pair of arrays. These partial product multiplications can be performed in any order by a computer processor since each multiplication operation does not depend on the result of the previous multiplication operation. As noted above, this removal of computational dependencies can be used to exploit the capabilities of some processors to perform out-of-order pipelined execution of operations.

Additionally, the present method is well suited to be used on SIMD processor architecture. As noted above, SIMD instructions take advantage of a regular structure in an algorithm to process multiple operations simultaneously. However, it is necessary when taking advantage of SIMD that the data be distributed carefully. Past techniques for performing large number multiplication on a SIMD machine required several data arrangement operations so that the data could be aligned properly for the carry propagation.

In contrast, the present system can take advantage of the benefits of a SIMD processor since the generation, and then the separate addition, of the two arrays, C and S, simplifies the arrangement of data required to use SIMD instructions. This simplification eliminates some of the shift and shuffle operations that existing techniques requires. It also delays the dependent chain of carry propagations required for each partial sum until the multiplication is finished. Thus, the present method requires no data rearrangement operations since adding the first array to the second array is not done until the multiplication steps are finished.

Those skilled in the art will also appreciate that the present system also improves the special case of squaring a large number. For instance, although half of the partial products are redundant when A=B, such a symmetrical structure cannot be taken advantage of with existing techniques because the extra addition can cause overflow, which must be compensated for in the algorithm. The present system, however, removes any possible potential of overflow.

In one embodiment, the present system can be incorporated into cryptographic software. Such software is known in the art. In other embodiments, the present system can comprise parts of computer programs written to process scientific data requiring the multiplication of large numbers.

The above-mentioned computer programs run on a central processing unit of the computer, and may be transferred to memory from permanent storage via disk drive when stored on removable media or via a network connection or modem connection when stored outside of the computer, or via other types of computer or machine readable medium from which it can be read and utilized. Thus, in the situation where large numbers need to be multiplied, a system such as described above delays the carry propagation addition step until all multiplication steps are complete, thus not requiring a multiplication/addition carryout propagating loop as in the past. This results in the lessening of time in multiplying the large numbers.

CONCLUSION

A method and system for multiplying two large multiplicands is discussed. In one embodiment, the method comprises generating a plurality of partial products by multiplying each digit of the first multiplicand with each digit of the second multiplicand, each of the plurality of partial products having a least significant digit and a most significant digit. Adding each of the most significant digits to a first array, adding each of the least significant digits to a second array. Then adding the first array to the second array.

In another embodiment, a system comprising a computer having a central processing unit and a computer readable medium having instructions for instructing the central processing unit to generate a product of two multiplicands. Each of the multiplicands having a plurality of digits. The instructions comprise a method of generating a plurality of partial products by multiplying each digit of the first multiplicand with each digit of the second multiplicand, each of the plurality of partial products having a least significant digit and a most significant digit. Adding each of the most significant digits to a first array and adding each of the least significant digits to a second array. Then adding the first array to the second array. In one, embodiment, the central processing unit comprises an SIMD architecture central processing unit.

In the above discussion, the term "computer" is defined to include any digital or analog data processing unit. Examples include any personal computer, workstation, set top box, mainframe, server, supercomputer, micro-controller, digital signal processor, laptop or personal digital assistant capable of embodying the inventions described herein.

Examples of articles comprising computer readable media are floppy disks, hard drives, CD-ROM or DVD media or any other read-write or read-only memory device.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An article comprising a computer readable medium having instructions thereon, wherein the instructions, when executed on a computer, create a system for executing a method for multiplying two multiplicands using a processor, each multiplicand larger than the processor's native multiply instruction capability, each multiplicand comprising a plurality of digits, the method comprising:

generating a first array and a second array, the first array containing a plurality of partial sums, each partial sum being the sum of a plurality of most significant digits corresponding to a position in the first array, each most significant digit comprising the most significant digit of a product of each digit of the first multiplicand multiplied with each digit of the second multiplic and, the second array containing a plurality of partial sums, each partial sum being the sum of a plurality of least significant digits corresponding to a position in the second array, each least significant digit comprising the least significant digit of a product of each digit of the first multiplicand multiplied with each digit of the second multiplicand; and adding the first array and the second array by assigning to a location (x) in a third array the least significant digit of the sum of a value in a location (x) in the second array plus a value in a location (x−1) in the first array plus a carryout value.

2. The article of claim 1, wherein adding the first array to the second array is done only after the first array and second array have been generated.

3. An article comprising a computer readable medium having instructions thereon, wherein the instructions, when executed on a computer, create a system for executing a method for multiplying two multiplicands, each of the multiplicands having a plurality of digits, the method comprising:

generating a plurality of partial products by multiplying each digit of the first multiplicand with each digit of the second multiplicand, each of the plurality of partial products having a least significant digit and a most significant digit;

storing a plurality of partial sums in a first array, each partial sum being the sum of a plurality of most significant digits corresponding to a position in the first array;

storing a plurality of partial sums in a second array, each partial sum being the sum of a plurality of least significant digits corresponding to a position in the second array; and adding the first array to the second array to obtain a product of the first multiplicand and the second multiplicand by assigning to a location (x) in a third array the least significant digit of the sum of a value in a location (x) in the second array plus a value in a location (x−1) in the first array plus a carryout value;

wherein adding the first array to the second array is delayed until each of the plurality of digits of each of the multiplicands has been multiplied and each of the resulting most significant digits has been stored in the first array and each of the resulting least significant digits has been stored in the second array.

4. The article of claim 3, wherein generating a plurality of partial products by multiplying each digit of the first multiplicand with each digit of the second multiplicand comprises:

separating each multiplicand into a plurality of n-bit pieces, wherein n is the size of the largest multiplicand that can be used with a native processor multiply instruction;

multiplying each n-bit piece of the first multiplicand with each n-bit piece of the second multiplicand.

5. The article of claim 3, wherein adding each of the most significant digits to a first array comprises:

assigning each of the most significant digits to a location in the first array that is equivalent to a sum of the locations of the digits of each multiplicand that were multiplied together;

adding together each most significant digit having the same location; and wherein adding each of the least significant digits to a second array comprises:

assigning each of the least significant digits to a location in the second array that is equivalent to a sum of the locations of the digits of each multiplicand that were multiplied together;

adding together each least significant digit having the same location.

6. A system comprising:

a computer having a central processing unit; and a computer readable medium having instructions for instructing the central processing unit to generate a product of two multiplicands, each of the multiplicands having a plurality of digits, by performing the method of:

generating a plurality of partial products by multiplying each digit of the first multiplicand with each digit of the second multiplicand, each of the plurality of partial products having a least significant digit and a most significant digit;

storing a plurality of partial sums in a first array, each partial sum being the sum of a plurality of most significant digits corresponding to a position in the first array;

storing a plurality of partial sums in a second array, each partial sum being the sum of a plurality of least significant digits corresponding to a position in the second array; and adding the first array to the second array to obtain a product of the first multiplicand and the second multiplicand by assigning to a location (x) in a third array the least significant digit of the sum of a value in a location (x) in the second array plus a value in a location (x−1) in the first array plus a carryout value;

wherein adding the first array to the second array is delayed until each of the plurality of digits of each of the multiplicands has been multiplied and each of the resulting most significant and least significant digits has been assigned to either the first array or the second array.

7. The system of claim 6, wherein the central processing unit includes a native processor multiply instruction and wherein the computer readable medium includes instructions for breaking each multiplicand into the plurality of digits when each of the multiplicands is larger than the native processor multiply instruction.

8. The system of claim 7, wherein each digit is at most an n-bit size piece of the multiplicand, wherein n is the size of the largest multiplicand that can be used with the native processor multiply instruction.

9. The system of claim 6, wherein the central processing unit comprises an SIMD architecture central processing unit.

10. The system of claim 6, wherein the computer readable medium includes instructions for breaking each multiplicand into the plurality of digits when each of the multiplicands is greater than a native capability of the central processing unit.

11. An article comprising a computer readable medium having instructions thereon, wherein the instructions, when executed on a computer, create a system for executing a method for multiplying two multiplicands, the method comprising:

separating each multiplicand into a plurality of n-bit size pieces, wherein n is the size of the largest multiplicand that can be used with a native processor multiply instruction;

multiplying each n-bit size piece of the first multiplicand with each n-bit size piece of the second multiplicand to form a plurality of partial products;

separating each of the plurality of partial products into a least significant digit and a most significant digit;

storing a plurality of partial sums in a first array, each partial sum being the sum of a plurality of most significant digits corresponding to a position in the first array;

storing a plurality of partial sums in a second array, each partial sum being the sum of a plurality of least significant digits corresponding to a position in the second array; and adding the first array and the second array by assigning to a location (x) in a third array the least significant digit of the sum of a value in a location (x) in the second array plus a value in a location (x−1) in the first array plus a carryout value.

12. The article of claim 11 wherein adding the first array and the second array is not done until after the previous steps are completed.

* * * * *

UNITED STATES PATENT AND TRADEMARK OFFICE
CERTIFICATE OF CORRECTION

PATENT NO. : 6,633,896 B1  
DATED : October 14, 2003  
INVENTOR(S) : Stephen F. Moore and Seth Abraham It is certified that error appears in the above-identified patent and that said Letters Patent is hereby corrected as shown below:

Column 8,
Line 2, delete "multiplic and" and insert -- multiplicand -- therefor.

Signed and Sealed this

Twenty-third Day of March, 2004

JON W. DUDAS
*Acting Director of the United States Patent and Trademark Office*